CHARLES R. HOLT
JIMMIE C. DAVIS
INVENTORS

ATTORNEY

Dec. 5, 1961

C. R. HOLT ET AL 3,012,225

WARNING DEVICE FOR INDICATING CONTACT OF
A VEHICLE WITH ANOTHER OBJECT

Filed Nov. 4, 1959

CHARLES R. HOLT
JIMMIE C. DAVIS
INVENTORS

BY Loyd J. Miller

ATTORNEY

United States Patent Office 3,012,225
Patented Dec. 5, 1961

3,012,225
WARNING DEVICE FOR INDICATING CONTACT OF A VEHICLE WITH ANOTHER OBJECT
Charles R. Holt, 4322 N. Granger, and Jimmie C. Davis, 744 N. Meridian, both of Oklahoma City, Okla.
Filed Nov. 4, 1959, Ser. No. 850,868
3 Claims. (Cl. 340—61)

The present invention relates to the trucking industry and more particularly to a proximity warning device for vehicles.

The principal object of the instant invention is to provide a warning device which will warn the driver of the vehicle of its proximity to a loading dock, ramp or other vehicles, when backing the vehicle.

Another object is to provide a device of this class which will eliminate damage, during backing, to trailers and other vehicles as well as loading docks.

Another object is to provide a device of this class which may be actuated for operation by the driver of the vehicle without leaving the cab thereof.

Still another object is to provide a device of this character which, after being actuated for use in backing the vehicle, may be returned to its folded or retracted position by remote control.

A further object is to provide a device of this class which is simple in construction, positive in operation and which will not easily get out of working order.

The present invention accomplishes these and other objects by providing a housing for installation on an outer surface of a vehicle. A solenoid is mounted within the housing and a feeler arm is mounted at one end within the housing in spaced relation with respect to the solenoid. A lever is pivotally connected intermediate its ends to the housing and extends between and is pivotally connected to the feeler arm and the solenoid. Electrical wiring means connects the solenoid to the vehicle battery for actuating the solenoid and extending the feeler arm outwardly of the housing. The electrical wiring includes a switch within the housing which is closed by the movement of the lever in response to the movement of the feeler arm when contacting an object for sounding an electrical signal.

Other objects will be apparent from the following description when taken in conjunction with the accompanying two sheets of drawings, wherein:

FIGURE 2 is a vertical cross-sectional view, taken substantially along line 2—2 of FIG. 1, illustrating the feeler arm in folded position;

Like characters of reference designate like parts in those figures of the drawings in which they occur.

In the drawings:

Figure 1:
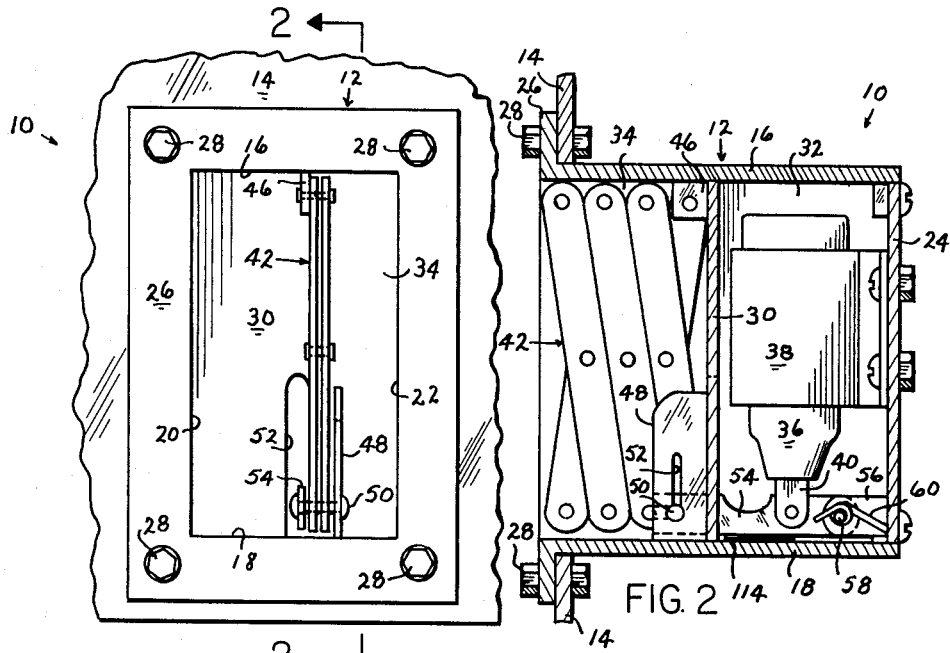
FIGURE 1 is a fragmentary elevational view of a truck rear end illustrating the truck rear end warning device when mounted thereon.
Figure 3:
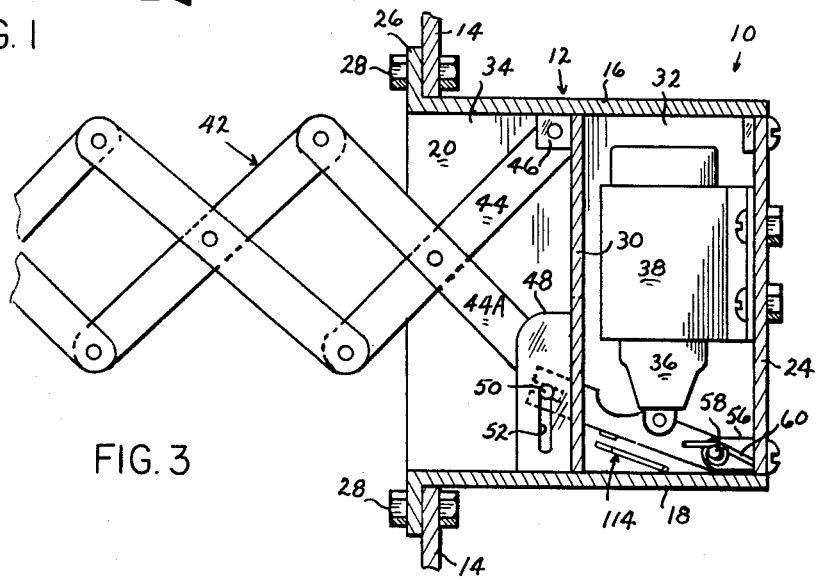
FIGURE 3 is a view similar to FIG. 2 illustrating the feeler arm in extended position.

Referring more particularly to FIGS. 1 to 3, reference numeral 10 indicates the device as a whole, including a rectangular housing 12, preferably mounted inwardly of the rear end surface 14 of a truck or trailer. The housing 12 includes top and bottom members 16 and 18, side members 20 and 22 and an inner end member 24.

The end of the housing opposite the end member 24 is open and is surrounded by an outstanding flange 26 which secures the housing to the truck surface 14 by bolt and nut means 28. A partition wall 30 extends between the top and bottom 16 and 18 and the opposing side walls 20 and 22 for dividing the housing into an inner compartment 32 and an outer compartment 34. A solenoid 36 is mounted within the inner compartment to the end wall 24 by bracket means 38 with the plunger 40 of the solenoid disposed downwardly, as seen in FIGS. 2 and 3, and in spaced relation, with respect to the bottom wall 18 when the solenoid is de-energized. A feeler arm, comprising a lazy tong member 42, has one end blade 44 thereof pivotally mounted within the outer compartment 34 by connecting the free end of the blade 44 to a lug 46, rigidly connected to the adjacent side of the partition wall 30 and the adjacent surface of the top 16. The other co-operating lazy tong end blade 44A is pivotally connected, for vertical reciprocating movement, to a vertically disposed guide member 48, rigidly carried by the wall 30 within the outer compartment 34, by a horizontal pin 50 extending through a vertical slot 52 in the guide 48.

Figure 4:
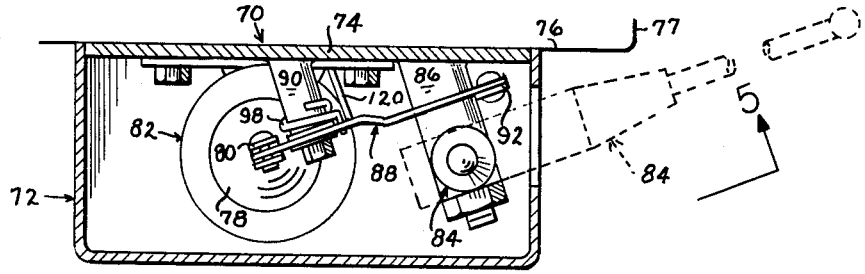
FIGURE 4 is a vertical cross-sectional view, partly in elevation, through the housing of a truck side warning device.

A lever 54 is pivotally connected at one end to a bracket 56 attached to the wall 24 by a pin 58. The opposing end of the lever 54 is provided with a slot 60 for receiving the pin 50. The solenoid plunger 40 is connected to the lever 54 intermediate the ends of the latter. Thus when the solenoid is energized and its plunger is retracted, the lever 54 is raised, sliding the pin 50 vertically in the guide slot 52, thus extending the lazy tong member 42 outwardly of the housing 12 and the truck end or surface 14 (FIG. 4). A spring 62 wound around the pin 58 and connected with the lever 54 and bracket 56, respectively, pulls the solenoid plunger 40 downwardly, as viewed in FIGS. 2 and 3, when the solenoid is de-energized for retracting the lazy tong member 42 into the housing 12.

Figure 5:
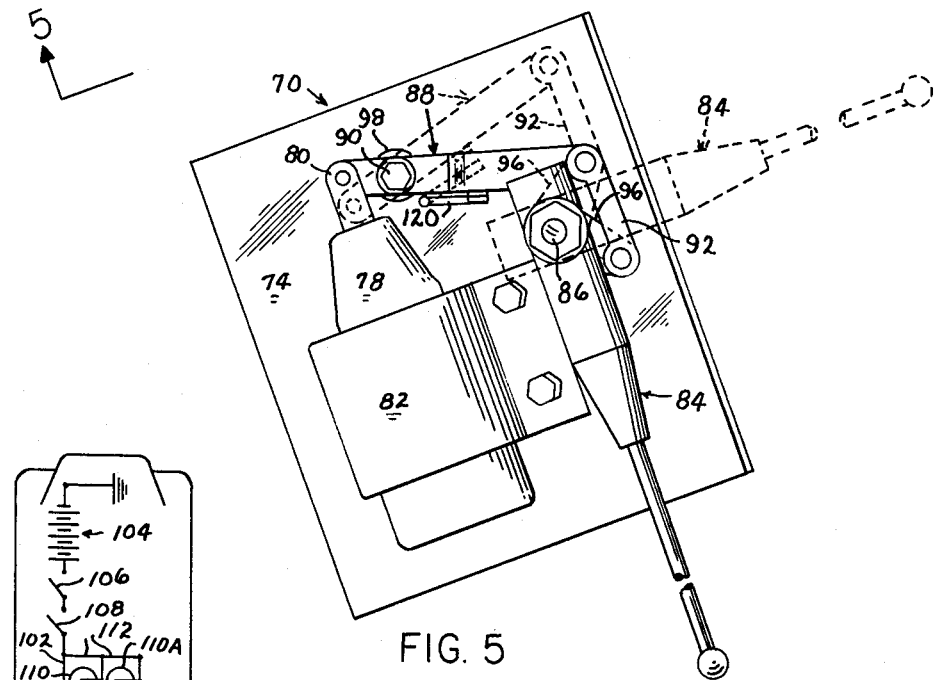
FIGURE 5 is a bottom view of a projection of the truck side warning device taken substantially along line 5—5 of FIG. 4; and, FIGURE 6 is a wiring diagram of both warning devices installed on a truck, or the like, the truck being shown in outline.

Referring more particularly to FIGS. 4 and 5, a truck side mounting warning device is indicated generally by the numeral 70 and includes a substantially rectangular housing 72 preferably mounted by one end wall 74 to the lower surface 76 of a truck or trailer and adjacent one side thereof as indicated by the line 77. A solenoid 78, having a plunger 80, is connected to the housing wall 74 by bracket means 82. An elongated rod-like feeler arm 84 is pivotally connected at one end to the wall 74 by a support 86. The support 86 is positioned in angular relation with respect to the wall 74 for positioning the feeler arm 84 to extend angularly upward and outward of the truck or trailer side 77 when the feeler arm is in extended or operative position, as shown by dotted lines. A lever 88 is pivotally connected, intermediate its ends, to a second support 90 projecting outwardly of the wall 74 parallel with the support 86. The lever 88 extends between and is connected at its respective ends to the plunger 80 and a link 92 which is in turn pivotally connected to a lug 96, rigidly attached to the feeler arm 84, thus when the solenoid 78 is energized and retracts its plunger 80, the lever pivots about the support 90 and rotates the feeler arm 84 to the position indicated by dotted lines. Similarly a spring 98, connected with the support 90 and the lever 88, aids the solenoid plunger 80 in returning the feeler arm to the position shown by solid lines when the solenoid is de-energized.

*Operation*

Figure 6:
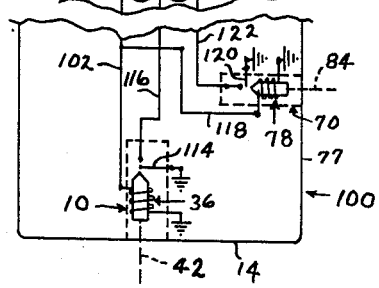

The operation of the warning devices will be readily understood by referring more particularly to FIG. 6, wherein the numeral 100 indicates a truck, or the like, on which the devices 10 and 70 have been installed. A wire 102 connects the truck battery 104 to the solenoid 36 through an ignition switch 106 and another switch 108. The other end of the coil of the solenoid 36 is connected to ground. Thus, when the ignition switch 106 is closed the switch 108 may then be manually closed which energizes the solenoid 36 and extends the lazy tong feeler arm 42, as is indicated by the dotted lines 42.

An electrical signal comprising a red warning light 110, but which may be a bell, buzzer or any other warning signal, is connected to the wire 102 by a wire 112 and to one contact of a normally open switch 114, associated with the lever 54 by a wire 116. The other contact of the switch 114 is grounded. Thus, when the free end of the lazy tong member 42 contacts a dock, or the like, thus forcing the lazy tong member toward its folded or retracted position, the lever 52 is forced downwardly closing the switch 114, lighting the lamp 110 to warn the driver of the proximity of the truck end 14 to the dock, not shown. The solenoid 78 is similarly connected to the battery 104 over the wire 102 and a wire 118 while the other end of the solenoid coil 78 is connected to ground. Thus, closing the switch 108, energizes the solenoid 78 for pivoting the feeler arm 84 to its extended position laterally of the truck side.

Similarly a second electrical warning means, such as a lamp 110A, is connected to the wire 112 and one contact of a normally open switch 120 associated with the lever 88 by a wire 122. The other contact of the switch 120 is grounded. Thus, when the feeler arm 84 contacts an object, the arm 84 is pivoted toward its solid line position, as shown in FIG. 5, whereby the lever 88 closes the switch 120 and actuates the signal 110A.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A proximity warning device for vehicles, including: a housing mounted on an outer rearward surface of said vehicle, said housing having an inner end wall; a solenoid mounted on said inner end wall, said solenoid having a plunger; a lazy tong feeler arm pivotally mounted at one end in said housing in spaced-apart relation with respect to said solenoid and adapted to be extended outwardly of the rearward outer surface of said vehicle; means including a lever pivotally connected to said solenoid plunger, said lazy tong feeler arm and said inner end wall for extending said lazy tong feeler arm outwardly of said housing and beyond the limit of the rearward surface of said vehicle when the solenoid is energized; and electrical circuit means connecting a source of electrical energy to said solenoid, said circuit means including an electrical signal, a first switch for energizing said solenoid and a second normally open switch closed only by the movement of said lever in response to movement of the extended feeler arm inwardly of said housing.

2. A proximity warning device for vehicles, including: a housing mounted on said vehicle; a solenoid mounted within said housing, said solenoid having a plunger; a lazy tong feeler arm mounted within said housing and adapted to be moved horizontally into and out of said housing; a lever pivotally connected intermediate its ends to said plunger and pivotally connected at its opposing ends to said housing and said lazy tong feeler arm, respectively, for moving said lazy tong feeler arm out of said housing when the solenoid is energized; a first electrical circuit connecting said solenoid with a source of electrical energy for energizing said solenoid; electrical signal means carried by said vehicle; and a second electrical circuit connected with a source of electrical energy and having a normally open switch mounted within said housing and closed only by the movement of said lever when said feeler arm is moved inwardly of said housing for sounding said signal means.

3. A proximity warning device for vehicles, including: a housing mounted inwardly of an outer surface of said vehicle, said housing having opposing side walls, a top and a bottom wall and an inward end wall; a partition wall extending between said top and bottom walls for dividing said housing and forming an outer and an inner compartment, said partition wall having a vertical slot for communication between the compartments; a vertically disposed guide secured to said partition wall within the outer compartment and adjacent said bottom wall, said guide having a vertical slot; a lazy tong member pivotally secured, by the free end of one of its end blades, to said partition wall and slidably connected by the free end of the adjacent co-operating blade with said guide for vertical reciprocating movement; a lever pivotally connected at one end to said inner end wall and projecting outwardly of the inner compartment through the slot in said partition wall and pivotally connected with the vertical reciprocating blade end of said lazy tong member; a solenoid mounted on said inner end wall, said solenoid having a plunger pivotally connected to said lever intermediate the ends of the latter for raising said lever and extending said lazy tong member outwardly of said housing when the solenoid is energized; electrical wiring and switch means connecting a source of electrical energy to said solenoid; and electrical signal means interposed in said wiring and having a normally open switch closed by movement of said lever when the extended end of said lazy tong member is moved toward said housing.

References Cited in the file of this patent

UNITED STATES PATENTS

| | | |
|---|---|---|
| 1,424,070 | Blair | July 25, 1922 |
| 2,592,742 | Rose | Apr. 15, 1952 |
| 2,786,910 | Tyska | Mar. 26, 1957 |